(12) United States Patent
Tring et al.

(10) Patent No.: US 9,020,543 B2
(45) Date of Patent: Apr. 28, 2015

(54) METHOD, BASE STATION AND USER EQUIPMENT FOR REDUCING A COGNITIVE PILOT CHANNEL BANDWIDTH

(75) Inventors: Jerome Tring, Reading (GB); Lahouari Korbaa, Reading (GB); Belkacem Mouhouche, Reading (GB)

(73) Assignee: NEC Corporation, Tokyo (JP)

(*) Notice: Subject to any disclaimer, the term of this patent is extended or adjusted under 35 U.S.C. 154(b) by 765 days.

(21) Appl. No.: 13/263,677

(22) PCT Filed: Apr. 9, 2010

(86) PCT No.: PCT/JP2010/002627
§ 371 (c)(1),
(2), (4) Date: Jan. 11, 2012

(87) PCT Pub. No.: WO2010/116765
PCT Pub. Date: Oct. 14, 2010

(65) Prior Publication Data
US 2012/0108247 A1    May 3, 2012

(30) Foreign Application Priority Data
Apr. 9, 2009    (EP) .................................... 09157745

(51) Int. Cl.
H04W 4/14    (2009.01)
G06F 7/00    (2006.01)
H04W 36/38    (2009.01)

(52) U.S. Cl.
CPC .................................. *H04W 36/385* (2013.01)

(58) Field of Classification Search
USPC ............................................. 341/60; 455/466
See application file for complete search history.

(56) References Cited

U.S. PATENT DOCUMENTS

2002/0089437 A1*    7/2002    Le et al. .......................... 341/60

FOREIGN PATENT DOCUMENTS

| CN | 101098294 A | 1/2008 |
| JP | 2002533032 A | 10/2002 |
| JP | 200981547 A | 4/2009 |
| WO | 0036853 A3 | 6/2000 |
| WO | 02080485 A1 | 10/2002 |
| WO | 2008/119380 A1 | 10/2008 |

OTHER PUBLICATIONS

Notification of Reasons for Rejection, dated Sep. 3, 2013, issued by the Japanese Patent Office in counterpart Japanese Application No. 2011-543399.

(Continued)

*Primary Examiner* — Mahendra Patel
*Assistant Examiner* — Natasha Cosme
(74) *Attorney, Agent, or Firm* — Sughrue Mion, PLLC

(57) ABSTRACT

The invention relates to a method for reducing a Cognitive Pilot Channel (CPC) bandwidth used for transmitting lists of information to a plurality of meshes of a geographical area comprising at least one base station (4) covering n meshes to allow a User Equipment camping on a given mesh among said plurality of meshes to select an operator and/or an access technology and/or a communication frequency available in said given mesh.
According to the invention, for a given mesh #i (i=2 to n), the base station transmits to said mesh #i an identifier of a predetermined reference mesh and the difference between the list of information intended for said given mesh and the list of information intended for said reference mesh.

3 Claims, 2 Drawing Sheets

(56) References Cited

OTHER PUBLICATIONS

Paul Houze, et al., "Common Pilot channel for network selection", IEEE Vehicular Technology Conference, XX, XX, May 8, 2006, pp. 67-71, XP002411303.
Jordi Perez-Romero, et al., "A Novel On-Demand Cognitive Pilot Channel Enabling Dynamic Spectrum Allocation", New Frontiers in Dynamic Spectrum Access Networks, 2007, 2nd IEEE International Symposium on, IEEE, PI, Apr. 1, 2007, pp. 46-54, XP031095601.
International Search Report for PCT/JP2010/002627 dated Jun. 2, 2010.
Communication dated Nov. 5, 2013, issued by the State Intellectual Property Office of P.R. China in counterpart Chinese application No. 201080015732.8.

* cited by examiner

US 9,020,543 B2

METHOD, BASE STATION AND USER EQUIPMENT FOR REDUCING A COGNITIVE PILOT CHANNEL BANDWIDTH

CROSS REFERENCE TO RELATED APPLICATIONS

This application is a National Stage of International Application No. PCT/JP2010/002627, filed on Apr. 9, 2010, which claims priority from European Patent Application No. 09157745.2, filed on Apr. 9, 2009, the contents of all of which are incorporated herein by reference in their entirety.

TECHNICAL FIELD

The invention pertains to telecommunication field and concerns a method for reducing a Cognitive Pilot Channel (CPC) bandwidth used for transmitting lists of information to a plurality of meshes of a geographical area comprising at least one base station covering said plurality of meshes to allow a User Equipment camping on a given mesh among said plurality of meshes to select an operator and/or an access technology and/or a communication frequency available in said given mesh.

The invention also concerns a base station covering a geographical area comprising a plurality of meshes receiving a Cognitive Pilot Channel (CPC) carrying lists of information on operators, access technology and radio frequencies available in each mesh.

The invention further concerns User Equipment (UE) camping on a mesh of a geographical area comprising a plurality of meshes receiving a Cognitive Pilot Channel (CPC) carrying lists of information on operators, access technology and radio frequencies available in each mesh.

BACKGROUND ART

Cognitive Pilot Channel (CPC) is a concept used in cognitive radio to provide information to cognitive mobiles about the available operators, Radio Access Technologies (RAT) and Frequencies available in a geographical area.

Two Major concepts for Cognitive Pilot Channel are proposed by the E3 project and ETSI RRS Group: Mesh based and Optimised broadcast approach.
  Mesh based concept in which a cell in the geographical area is divided into a plurality of meshes and information is provided about operators, RAT and Frequencies available in each mesh.
  Optimised broadcast concept in which information about all the RATs and frequencies available in the cells is transmitted.

DISCLOSURE OF INVENTION

Although Mesh based concept is more precise than Optimised broadcast concept, it presents a drawback resulting from the fact that the transmission of information to the meshes requires a larger frequency band to be allocated to CPC.

One of the proposed methods to reduce the CPC data rate is to transmit the same CPC for the whole cell, not to meshes of said cell, and transmit the coverage area for each technology and frequency. The problem with this kind of approach is that coverage areas are not easily characterized and transmitting a detailed coverage area may result in a large data-rate as well.

MEANS TO SOLVE THE PROBLEM

The present invention aims at reducing the CPC data rate.
Another object of the invention is to reduce the CPC message length to enable a shorter period between mesh information occurrences for the same bit rate.
The invention also aims at reducing the required bandwidth for the CPC use while increasing CPC message robustness.
The invention is based on the fact that close meshes usually differ by only few frequencies.
Thus instead of transmitting the whole information each time, in the method according to the invention, all the information is first transmitted to a reference mesh, and only information about the difference between each mesh is subsequently transmitted to a given mesh.
This object is achieved by means of a method for reducing a Cognitive Pilot Channel (CPC) bandwidth used for transmitting lists of information to a plurality of meshes of a geographical area comprising at least one base station covering said plurality of meshes to allow a User Equipment camping on a given mesh among said plurality of meshes to select an operator and/or an access technology and/or a communication frequency available in said given mesh.
The method according to the invention comprises the following steps:
  providing the base station with said lists of information,
  defining a reference list of information associated to a reference mesh,
  associating an identifier to said reference mesh,
  transmitting the reference list of information to the reference mesh, and for each subsequent transmission of information to a given mesh,
  comparing the list of information intended for said given mesh to the list of information comprised in the reference list,
  determining from said comparison a difference between the list of information intended for said given mesh and the list of information comprised in the reference list,
  transmitting to said given mesh the identifier of the reference mesh along with the determined difference, and,
  upon reception of said identifier and said difference, the User Equipment automatically infers a complete list of operators, technologies and frequencies available in said given mesh from the difference between the list of information intended for said given mesh and the reference list.
According to a first variant of the invention,
  For i=2 to n, n being the number of meshes in the geographical area, the base station receives information about the operators, the technologies and the frequencies present in each mesh and selects mesh #1 as a reference mesh,
  the base station transmits the complete list of information concerning operators, Radio Access technologies (RAT) and frequencies present in the reference mesh #1,
  For i=2 to n, n being the number of meshes in geographical area, the base station compares information intended respectively for the mesh #i and mesh #i−1 and derives the differences between the list of information of each mesh and the following mesh,
  the base station transmits said difference to the mesh #i,
  upon reception of said difference, the User Equipment analyses the information intended for the reference mesh, and,
  For i=2 to m, where m is the rank of the mesh in which the UE is located, the UE determines the list of operators, RATs and frequencies present in mesh #m by including all the differences between consecutive meshes.

According to a second variant of the invention, the base station receives information about the operators, the technologies and the frequencies present in each mesh.

For i=1 to n, n being the number of meshes in the geographical area, the base station compares the list of information intended for a given mesh #m (1<m<n) to the list of information intended for each mesh #i (i=1 to n) and determines the closest mesh #A (A<i) to the given mesh #m and the difference between said closest mesh A and said mesh #m, the base station transmits the complete list of information concerning operators, Radio Access technologies (RAT) and frequencies present in the reference mesh #1, For i=2 to n, the base station transmits the information intended for the closest mesh #A and the difference in the available operators, RATs and frequencies between said given mesh #m and said closest mesh #A, and, upon reception of information intended for the closest mesh #A and the difference in the available operators, RATs and frequencies between the mesh #m and the closest mesh #A, the User Equipment determines the list of operators, RATs and frequencies present in mesh #m by including all the differences between said meshes #m and said closest meshes #A.

Preferably, the closest mesh #A (A<i) is the one whose information list is the closest to the information list of the mesh in which the UE is located.

In order to avoid error propagation, the base station transmits periodically a plurality of reference meshes to the geographical area.

The transmission periodicity is chosen depending on the reliability of the Cognitive Pilot Channel decoding.

The invention is implemented by at least one base station covering a geographical area comprising a plurality of meshes receiving a Cognitive Pilot Channel (CPC) carrying lists of information on operators, access technology and radio frequencies available in each mesh.

The base station according to the invention comprises:

definer that defines a reference list of information, associater that associates said reference list of information to a reference mesh, associater that associates an identifier to said reference mesh, transmitter that transmit the reference list of information to the reference mesh, comparer that compares the list of information intended for a given mesh to the list of information comprised in the reference list prior to each subsequent transmission of information to said given mesh, determiner that determines from said comparison a difference between the list of information intended for said given mesh and the reference list, transmitter that transmit to said given mesh the identifier of the reference mesh along with the determined difference in order to allow a User Equipment camping on said given mesh to automatically infer a list of operators, technologies and frequencies available in given mesh from differences between the list of information intended for the reference mesh and the list of information intended for the given mesh.

The User Equipment implementing the method according to the invention comprises inferrer that automatically infers a list of operators, technologies and frequencies available in the mesh in which said User Equipment is located from differences between the list of information intended for a predetermined reference mesh and the list of information intended for the mesh in which said User Equipment is located.

BRIEF DESCRIPTIONS OF DRAWINGS

The forgoing summary, as well as the following detailed description, will be better understood when read in conjunction with the appended figures illustrating an exemplary embodiment of the invention in which:

FIG. 1 schematically represents an area in which the method according to the invention is implemented;

BEST MODE FOR CARRYING OUT THE INVENTION

The invention will be described when implemented in a geographical area covered by at least one wireless telecommunication network and in which a Cognitive Pilot Channel is used for broadcasting information on the available Radio Access technologies (RATS) and frequencies to allow cognitive receiver such as mobile phones, PDA, or laptops to choose the most convenient RAT and frequency for communicating in the network. Said geographical area is divided into a number M of contiguous elementary meshes.

Figure 1:
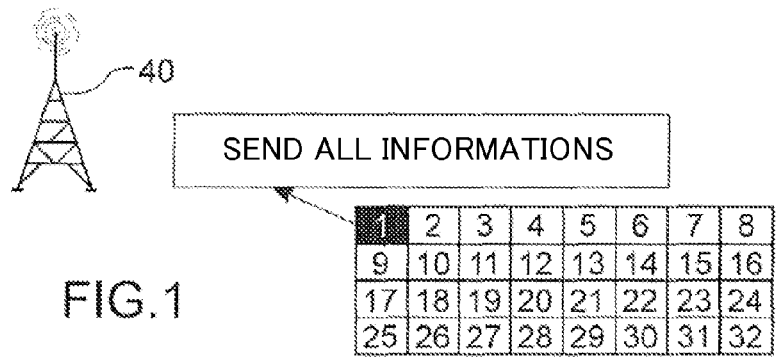

As illustrated by FIG. 1, the geographical area is divided into M=32 (thirty two) contiguous elementary meshes 2 covered by a base station 40 that broadcasts a Cognitive Pilot Channel (CPC) carrying lists of information on operators, access technology and radio frequencies available for each mesh #i (i=1 to 32).

The processing module of the base station 40 comprises definer that defines a reference list of information, associater that associates said reference list of information to a reference mesh, associater that associates an identifier to said reference mesh.

Said processing module is provided with software for comparing the list of information intended for any given mesh #i (i=1 to 32) to the list of information comprised in the reference list and for determining the difference between said lists of information.

In a first embodiment illustrated by FIG. 1, at step 50, the base station 4 transmits to mesh #1 a list of information indicating the operators, the Radio access technology and the communication frequency available in said mesh #1.

At step 52, the processing module of the base station sets the information transmission delay between two successive transmission at value D taking into account the size of the geographical area and the transmission conditions in that area.

At step 54, the processing module checks whether the period D has elapsed or not.

If the period D has elapsed (arrow 56), the base station transmits the complete list of information to any mesh #i (i=1 to 32).

At step 60, the processing module increments the rank of the mesh to receive the list of information and compare the current rank (step 62) with the total number (32) of meshes.

If all the meshes have received the list of information, the base station stops transmitting said lists (step 64), else, the process is resumed from step 54.

If the period D has not elapsed (arrow 68), for a given mesh #i (2<i<32), at step (70) the processing module compares the list of information intended for said mesh #i to the list of information intended for the preceding mesh (#i−1).

If the lists compared are identical (arrow 72), the processing module considers that the list to transmit to mesh #i is the list of information previously transmitted to mesh #i−1 (step 73).

Else, the base station transmits to mesh #i the information which is present in the list of mesh #i but absent from the list of mesh #i−1 (step 74).

At step 60, the processing module increments the rank of the mesh to receive the list of information and compare the current rank (step 62) with the total number (32) of meshes.

If all the meshes have received the list of information, the base station stops transmitting said lists (step 64), else, the process is resumed from step 54.

Figure 2:
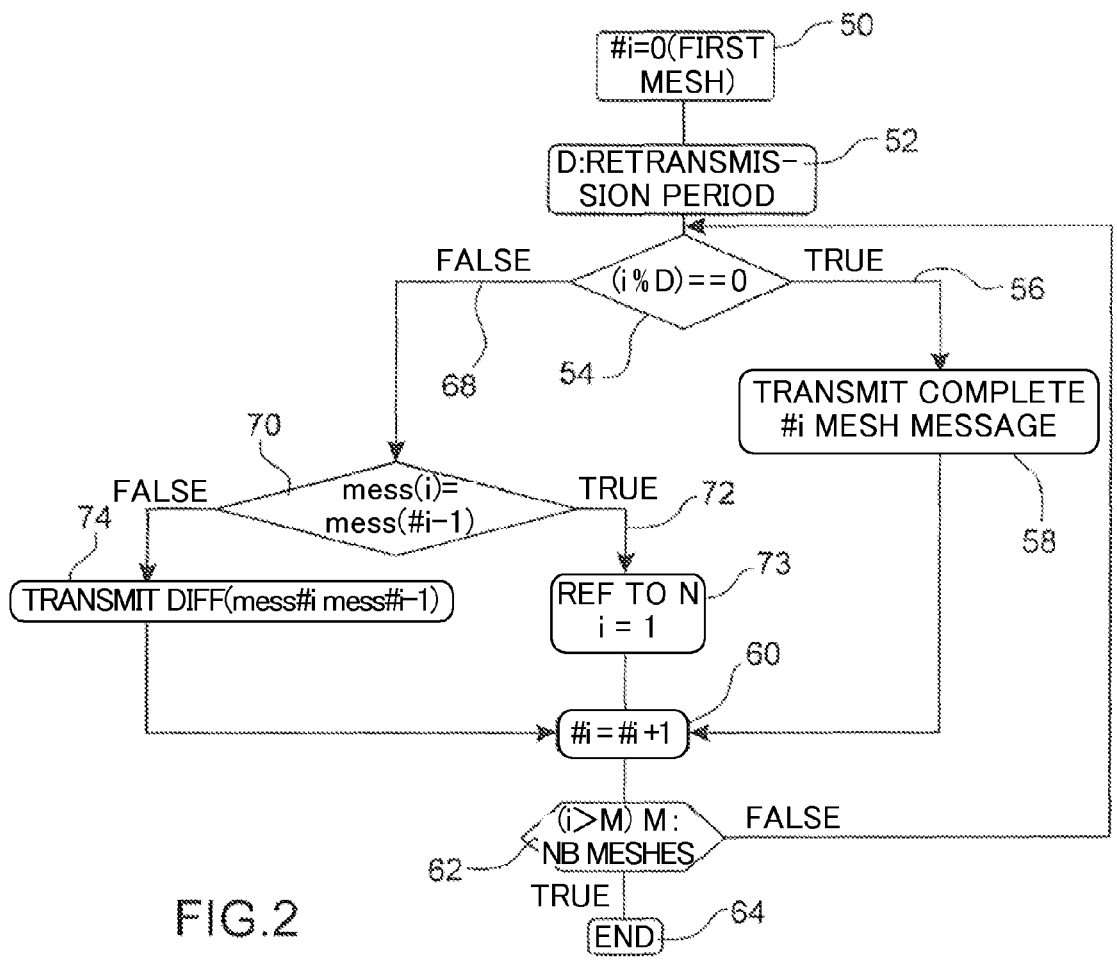
FIG. 2 is flow chart illustrating the steps of a first embodiment of the method according to the invention.
Figure 3:
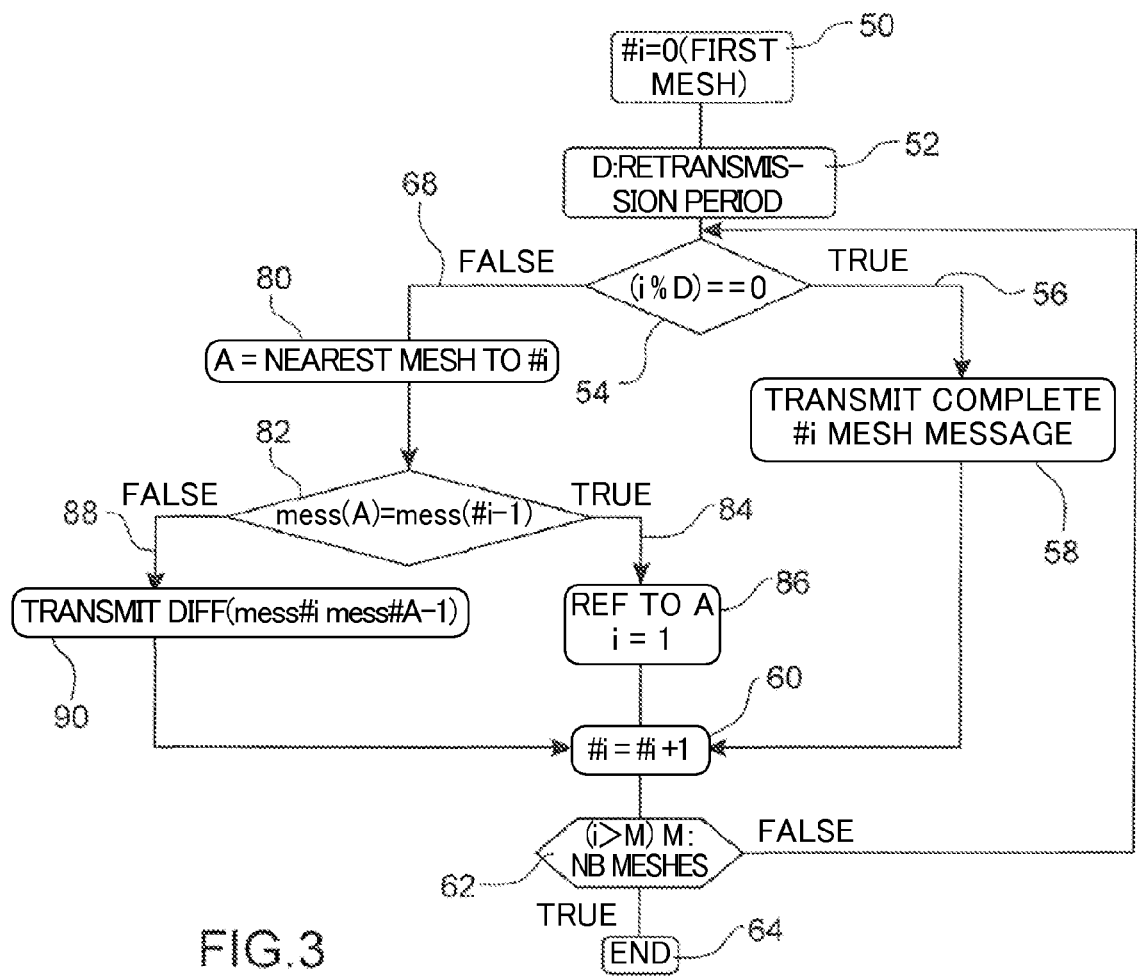
FIG. 3 is flow chart illustrating the steps of a second embodiment of the method according to the invention.

FIG. 2 is a flow chart illustrating the steps of a second embodiment of the method according to the invention comprising identical steps 50-68 as the first embodiment.

This second embodiment differs from the first embodiment by the steps 80 to 90 which will be described below.

At step 80, for a given mesh #i (i=2 to 32) the processing module determine a reference mesh which is not necessary the preceding mesh #i−1.

In this embodiment, the reference mesh is the closest mesh #A (A<i) to said mesh #i in the sense that the difference between the list of information intended for mesh #i and the list of information intended for mesh #A is minimum.

The closest mesh #A (A<i) is determined by means of a specific software programmed in the processing module and in the UE equipments roaming in the geographical area.

At step 82, the processing module compares the list of information intended for said mesh #i to the list of information intended for the the closest mesh #A (A<i).

If the lists compared are identical (arrow 84), the processing module considers that the list to transmit to mesh #i is the list previously transmitted to mesh #A (step 86).

Else (arrow 90), the base station transmits to mesh #i the information which is present in the list of information intended for mesh #i and absent from the list of mesh #A.

At step 60, the processing module increments the rank of the mesh to receive the list of information and compare the current rank (step 62) with the total number (32) of meshes.

If all the meshes have received the list of information, the base station stops transmitting said lists (step 64), else, the process is resumed from step 54.

It is to be noted that the User Equipment implementing the method according to the invention should comprises inferrer that automatically infers a list of operators, technologies and frequencies available in the mesh in which it is located from differences between the list of information intended for the predetermined reference mesh and the list of information intended for the mesh in which it is located.

What is claimed is:

1. A method for reducing a Cognitive Pilot Channel (CPC) bandwidth used for transmitting lists of information to a plurality of meshes wherein each mesh is covered by at least one base station to which a User Equipment camping on, said method comprising:
    defining a reference list of information associated with a reference mesh, —associating an identifier with said reference mesh, —transmitting the reference list of information;
    determining a difference from the reference mesh by comparing a list of information intended for the given mesh with the reference list of information; and
    transmitting the determined difference from the reference list of information associated with the reference mesh as the list of information,
    For i=2 to n, n being the number of meshes in the area covered by a base station, the base station receives information of each mesh and selects mesh #1 as a reference mesh,
    the base station transmits the complete list of information of the reference mesh #1,
    For i=2 to n, the base station derives the differences between the list of information of mesh #i and the list of information of mesh #i−1,
    the base station transmits the differences, and the UE determines the list of information of mesh #m wherein the UE is located by the reference list and the differences between mesh #i and mesh #i−1 (i=2 to m), wherein the period of the transmission of the list of information is chosen depending on the reliability of the Cognitive Pilot Channel decoding.

2. The method according to claim 1, further comprising:
    the UE determines the list of information of mesh #m wherein the UE is located by the reference list and the differences between mesh #i and mesh #i−1 (i=2 to B) wherein the B is the number of the closest mesh to mesh #m.

3. A method for reducing a Cognitive Pilot Channel (CPC) bandwidth used for transmitting lists of information to a plurality of meshes wherein each mesh is covered by at least one base station to which a User Equipment camping on, said method comprising:
    defining a reference list of information associated with a reference mesh;
    associating an identifier with said reference mesh, —transmitting the reference list of information;
    determining a difference from the reference mesh by comparing a list of information intended for the given mesh with the reference list of information; and
    transmitting the determined difference from the reference list of information associated with the reference mesh as the list of information, for i=2 to n, n being the number of meshes in the area covered by a base station, the base station receives information of each mesh and selects mesh #1 as a reference mesh, wherein the period of the transmission of the list of information is chosen depending on the reliability of the Cognitive Pilot Channel decoding.

* * * * *